US006427678B1

(12) United States Patent
Trzeciak

(10) Patent No.: US 6,427,678 B1
(45) Date of Patent: Aug. 6, 2002

(54) FISHING ROD HANDLE WARMER

(76) Inventor: William K. Trzeciak, 5911 Franklin Ave., LaGrange Highlands, IL (US) 60525

( * ) Notice: Subject to any disclaimer, the term of this patent is extended or adjusted under 35 U.S.C. 154(b) by 0 days.

(21) Appl. No.: 09/592,000

(22) Filed: Jun. 12, 2000

Related U.S. Application Data
(60) Provisional application No. 60/139,232, filed on Jun. 14, 1999.

(51) Int. Cl.$^7$ ............................................... A01K 97/00
(52) U.S. Cl. ......................................... 126/204; 43/25
(58) Field of Search ........................... 126/263.01, 204, 126/206; 43/23, 25; 219/535, 536, 537, 549; 224/267; 607/112

(56) References Cited

U.S. PATENT DOCUMENTS

| | | | | |
|---|---|---|---|---|
| 2,823,665 A | * | 2/1958 | Steinbach | 126/204 |
| 3,167,875 A | * | 2/1965 | Winner et al. | 126/204 |
| 4,381,025 A | * | 4/1983 | Schooley | 607/112 |
| 4,527,566 A | * | 7/1985 | Abare | 607/112 |
| 4,676,247 A | * | 6/1987 | Van Cleve | 607/112 |
| 5,496,358 A | * | 3/1996 | Rosenwald | 126/204 |
| 5,655,328 A | * | 8/1997 | Childs et al. | 43/23 |
| 5,928,275 A | * | 7/1999 | Yates et al. | 126/204 |
| 6,278,091 B1 | * | 8/2001 | Van Gooden | 219/549 |

* cited by examiner

*Primary Examiner*—Sara Clarke
(74) *Attorney, Agent, or Firm*—Brinks Hofer Gilson & Lione

(57) ABSTRACT

A warming apparatus for a fishing rod handle including a retaining mechanism having a first edge opposed to a second edge, the retaining mechanism adapted to receive at least one heat pack, and attachment means for connecting the first edge with the second edge of the retaining mechanism, wherein the warming apparatus is adapted to fold substantially around the fishing rod handle. By warming the fishing rod handle, the fisherman's hands can be kept warm while the fisherman is fishing without the need for bulky gloves or mittens that can increase the time it takes for one to catch fish and decrease the ease and efficiency of fishing. According to another aspect of the present invention, the retaining mechanism includes a heat pack that generates heat either through a chemical reaction or by using electricity.

4 Claims, 2 Drawing Sheets

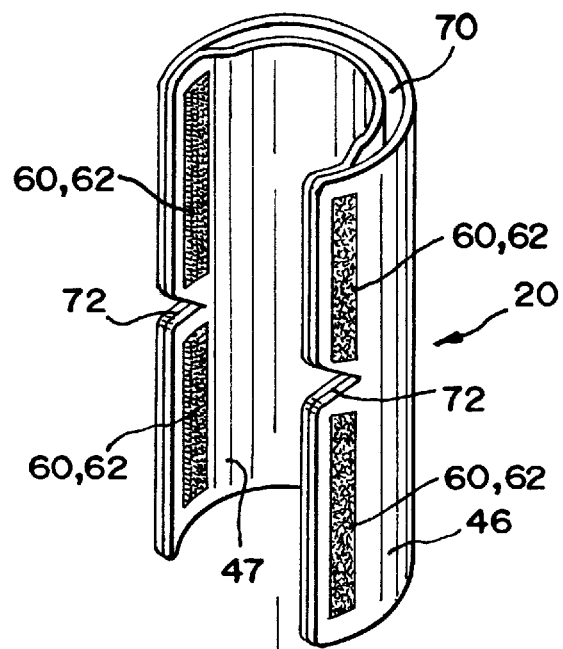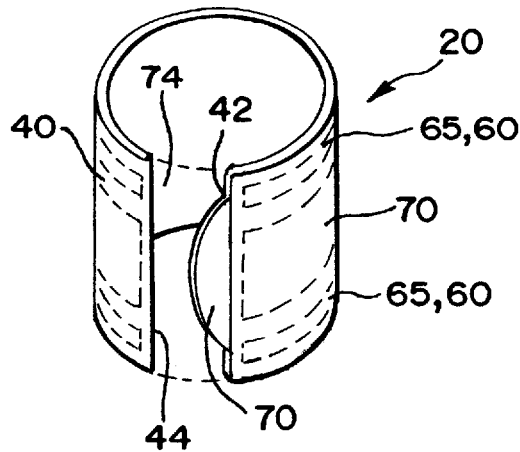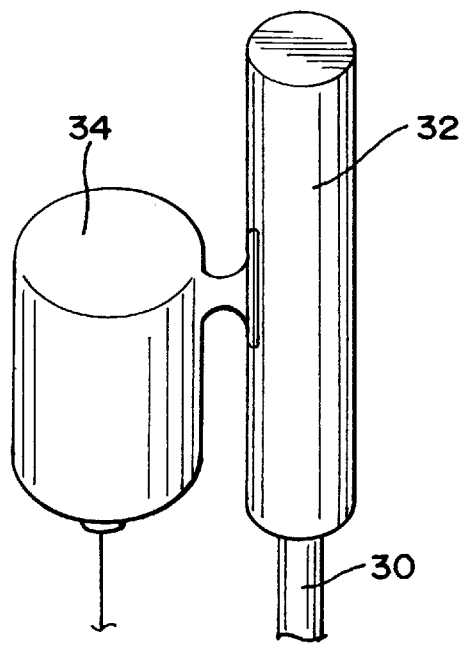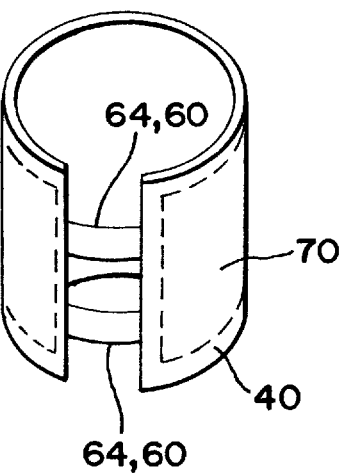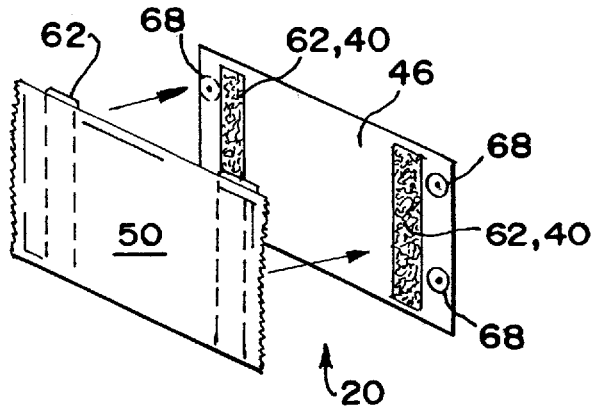

FISHING ROD HANDLE WARMER

CROSS REFERENCE TO RELATED APPLICATION

This application claims benefit under 35 U.S.C. 119(e) of the United States provisional application serial No. 60/139,232, filed on Jun. 14, 1999.

FIELD OF THE INVENTION

This invention relates, in general, to an apparatus for a fishing rod and, more particularly, to an apparatus and method for warming a fishing rod handle, wherein the apparatus includes a pouch adapted to receive a heat pack.

BACKGROUND

Traditionally, the best time for catching fish is either early in the morning or late in the evening because the fish are more active at these times of the day. Additionally, many fishermen enjoy fishing early or late in the fishing season, since often times there are more fish during these times of the season. However, the air temperature typically tends to be colder during these times of the day and these times of the season, which in turn causes the fishermen's hands to become cold and to even, in some cases, become frostbitten. In order to prevent their hands from freezing, fishermen often times are required to wear bulky gloves or even mittens, which tend to decrease the fishermen's dexterity. Bulky gloves and/or mittens prevent a fisherman from putting his finger on the fishing line to sense a bite, they also make it more difficult, if not impossible, to accomplish such tasks as removing a hook from a fish, baiting a hook, or tying a hook onto a fishing line. Many times, in order to accomplish these tasks, a fisherman must remove the gloves or mitten from his hands, a cumbersome and time consuming procedure.

Accordingly, further development of an apparatus and method for warming a fisherman's hands while fishing, and more specifically warming a fisherman's hands while holding a fishing rod, is necessary in order to decrease the time it takes for one to catch fish and increase the ease and efficiency of fishing.

SUMMARY

In view of the above limitations of existing apparatus and methods for warming a fisherman's hands while fishing, it is an aspect of the present invention to provide a warming apparatus for a fishing rod handle including a retaining mechanism having a first edge opposed to a second edge, the retaining mechanism adapted to receive at least one heat pack, and attachment means for connecting the first edge with the second edge, wherein the warming apparatus is adapted to fold substantially around the fishing rod handle. By this apparatus, the fisherman's hands can be kept warm while the fisherman is fishing without the need for bulky gloves or mittens that can increase the time it takes for one to catch fish and increase the ease and efficiency of fishing. According to one aspect of the present invention, the first edge and the second edge have a length substantially equal to the length of the fishing rod handle. According to another aspect of the present invention, the retaining mechanism includes a heat pack that generates heat either through a chemical reaction or by using electricity.

According to one aspect of the present invention, a method for warming a fisherman's hands is provided, the method including forming a retaining mechanism adapted to receive a heat pack for providing heat, the retaining mechanism having a first edge opposed to a second edge, securing a heat pack to the retaining mechanism, wrapping the retaining mechanism around a substantial portion of the fishing rod handle, and securing the retaining mechanism to the fishing rod handle.

BRIEF DESCRIPTION OF THE DRAWINGS

FIG. 4 is a perspective view of a warming apparatus being attached to a fishing rod having a fishing reel, according to another preferred embodiment;

FIG. 5 is a perspective view of a warming apparatus, according to another preferred embodiment;

FIG. 6 is a perspective view of a warming apparatus, according to another preferred embodiment; and FIG. 7 is a perspective view of a warming apparatus, according to another preferred embodiment.

Figure 1:
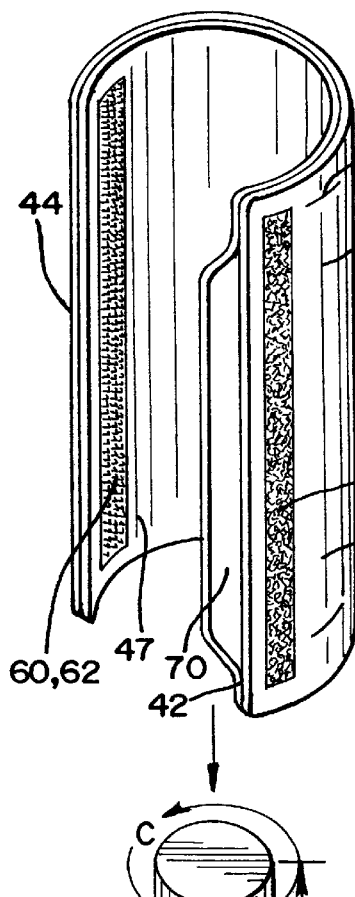
FIG. 1 is a perspective view of a warming apparatus being attached to a fishing rod handle, according to one preferred embodiment.

For simplicity and clarity of illustration, elements shown in the Figures have not necessarily been drawn to scale. For example, dimensions of some elements are exaggerated relative to each other. Further when considered appropriate, reference numerals have been repeated among the Figures to indicate corresponding elements.

DETAILED DESCRIPTION OF THE PRESENTLY PREFERRED EMBODIMENTS

Shown in FIG. 1 is a perspective view of a warming apparatus 20 for warming a fishing rod handle 32. Fishing rod handle 32 is typically connected to fishing rod 30 as illustrated in FIG. 1. Fishing rod handle 32 has a circumference C and a length L1, as denoted in FIG. 1. A fisherman typically grasps fishing rod 30 around fishing rod handle 32. Warming apparatus 20 includes a retaining mechanism 40 for securing a heat pack 50 and an attachment means 60 for securing the warming apparatus 20 to fishing rod handle 32, as illustrated in FIG. 1.

Figure 2:
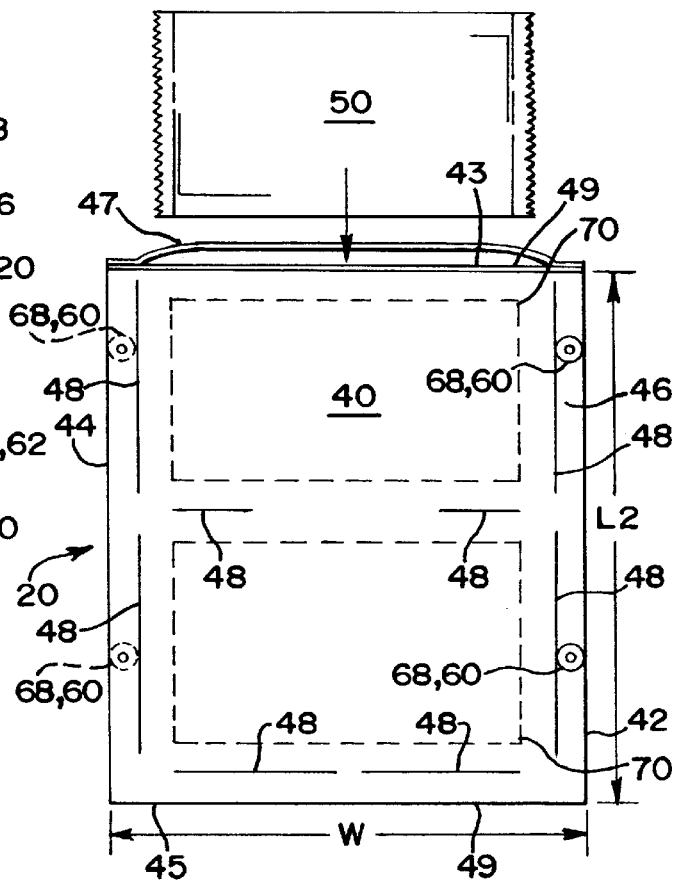
FIG. 2 is a perspective view of a heat pack being inserted into a warming apparatus, according to one preferred embodiment.

As shown in FIG. 2 warming apparatus 20 has a first edge 42 opposed to a second edge 44. In one preferred embodiment, first edge 42 and second edge 44 are relatively straight so that warming apparatus 20 can be wrapped around the cylindrical shape of most fishing rod handles 32. In one preferred embodiment, first edge 42 and second edge 44 include a notch 72. Notch 72 allows warming apparatus 20 to be wrapped around fishing rod handles 32 that are connected with a fishing reel 34, as illustrated in FIG. 4. Preferably, first edge 42 and second edge 44 each form one notch 72 approximately halfway up each edge, thereby allowing warming apparatus 20 to be wrapped further up the fishing rod handle 32 directly over the fishing reel 34, as illustrated in FIG. 4.

In addition to first edge 42 and second edge 44, warming apparatus 20 includes a top edge 43 opposed to a bottom edge 45. The distance between first edge 42 and second edge 44 is defined as width W, and the distance between top edge 43 and bottom edge 45 is defined as length L2. In one preferred embodiment, the length L2 and the width W of warming apparatus 20 are sufficient so as to allow warming apparatus 20 to cover more than 20% of the surface of fishing rod handle 32. Preferably, width W is approximately equal to or greater than the circumference C of fishing rod handle 32. In one preferred embodiment, the length L2 of warming apparatus 20 is equal to or greater than the length L1 of fishing rod handle 32. However, the length L2 of warming apparatus may be less than the length L1 of fishing rod handle 32. The length L2 and the width W of warming apparatus 20 can vary depending on the length L1 and circumference C of different fishing rod handles 32. Moreover attachment means 60 can be adjustably sized so as to fit fishing rod handles 32 having a wide range of circumferences C and lengths L1. In one preferred embodiment, warming apparatus 20 is manufactured from sturdy cloth material, approximately six inches in width W and eight inches in length L2.

Warming apparatus 20 includes a retaining mechanism 40 adapted to receive and secure at least one heat pack 50. Retaining mechanism 40 may receive heat pack 50 in any one of a number of ways known to those skilled in the art. For example, retaining mechanism 40 may receive heat pack 50 using a flat plate and a screw, a belt, a hook and loop type fastener such as VELCRO™, a cable, a snap fit member, glue, a magnet, a weld, using heat, using pressure, a captivating member such as a clip or spring, or any other device, member, or substance known by those skilled in the art that may be used to affix one member to another member. For example, in one preferred embodiment, retaining mechanism 40 includes a hook and loop type fastener 62 that is affixed to both heat pack 50 and a first sheet 46 of warming apparatus 20, as illustrated in FIG. 7. By using hook and loop type faster 62, retaining mechanism 40 is able to secure heat pack 50 to first sheet 46 of warming apparatus 20.

Figure 3:
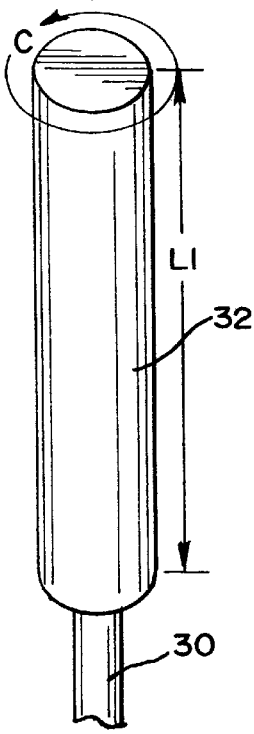
FIG. 3 is a perspective view of a warming apparatus, according to another preferred embodiment.
Figure 3:
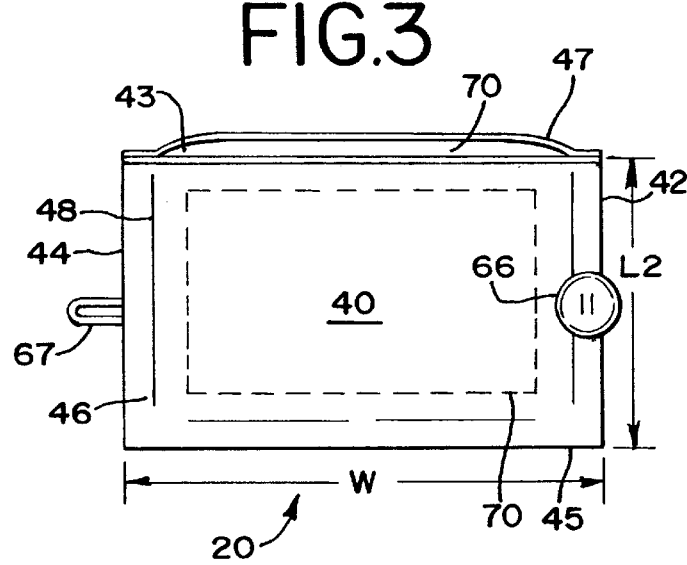

In one preferred embodiment, retaining mechanism 40 includes at least one pouch 70 adapted to receive heat pack 50, as illustrated in FIGS. 2 and 3. Preferably, pouch 70 has dimensions that are equal to or greater than the dimensions of heat pack 50, so that heat pack 50 can more easily be placed within pouch 70. Pouch 70 can be manufactured from either a single piece or multiple pieces of material. In one preferred embodiment, pouch 70 is manufactured from a single piece of material having a first edge 42 and a second edge 44. The material is folded over, closing off the one end, and then a first edge 42 and a second edge 44 are closed together thereby creating pouch 70. Pouch 70 is designed to receive and hold a heat pack 50. In one preferred embodiment pouch 70 is manufactured from first sheet 46 of material and a second sheet 47 of material as illustrated in FIGS. 1–3. Preferably, first sheet 46 and second sheet 47 have at least four edges 49, as illustrated in FIG. 2. First sheet 46 and second sheet 47 form pouch 70 by connecting the first sheet 46 with the second sheet 47 at at least three edges. In one preferred embodiment, first sheet 46 is connected with second sheet 47 at four edges, fully sealing heat pack 50 within warming apparatus 20, as illustrated in FIG. 6.

Preferably, first sheet 46 is connected to second sheet 47 at seams 48 near or around edges 49, as illustrated in FIG. 2. First sheet 46 can be connected to second sheet 47 in any one of a number of ways known to one of ordinary skill in the art, such as, by heating and melting, stitching, stapling, gluing, applying pressure, or any other way known to those skilled in the art. As illustrated in FIG. 2, seams 48 are slightly inwards and away from first edge 42, second edge 44, and bottom edge 45. Seams 48 can run continuously along or near edges 49 or they can run along a portion of edges 49 as illustrated in FIG. 2. Seams 48 help to form pouches 70 adapted to receive at least one heat pack 50. While in the above embodiments retaining mechanism 40 includes one pouch 70, retaining mechanism 40 can include multiple pouches 70 designed to receive multiple heat packs 50, as illustrated in FIG. 2.

Heat pack 50 generates heat that can be used to warm a fisherman's hands. Preferably, heat pack 50 is flexible or moldable, so that it can be fitted and secured around the fishing rod handle 32. Heat pack 50 can generate heat through a chemical reaction, by using electricity, or by any other method for generating heat known to those skilled in the art. For example, heat pack 50 can generate heat through a chemical reaction that occurs by exposing the heat pack to oxygen, such the chemical reaction that occurs with the Mini-Mini Heater manufactured by John Wagner Associates, Inc., of Concord, Calif. The chemical heat pack 50 contains a thin layer of chemicals giving the same texture as soft molten clay. The clay texture allows the chemical heat pack 50 to be held securely in place and to be easily molded around the fishing rod handle 32. In one preferred embodiment, heat pack 50 generates heat using a battery-powered devices that heats a series of resistive elements or coils through the electricity stored in the batteries.

Attachment means 60 is adapted to secure warming apparatus 20 to fishing rod handle 32. In one preferred embodiment, attachment means 60 secures warming apparatus 20 to fishing rod handle 32 by connecting first edge 42 with second edge 44. By connecting first edge 42 to second edge 44, warming apparatus 20 forms a generally cylindrical shape which can be more easily coupled to and secured around fishing rod handle 32. Preferably warming apparatus 20 forms a cylindrical shape having a circumference which is approximately equal to the circumference C of fishing rod handle 32 so that warming apparatus 20 can be relatively, fixedly secured onto fishing rod handle 32. Attachment means 60 may comprise any device or member which can be used to attach first edge 42 to second edge 44, such as a screw, a clip, a hoop and loop type fastener 62, a cable, a thread, a snap fit member 68, a captivating member such as a spring or a clip, a button 66 and a loop 67, an elastic band 64, a magnet 63, or any other device known by those skilled in the art. In one preferred embodiment, hook and loop fastener, such as VELCRO™, is sewn, hot-glued or otherwise affixed to respective sides of retaining mechanism 40, as illustrated in FIG. 1. In one preferred embodiment, attachment means 60 includes a button 66 that fastens to a loop 67, as illustrated in FIG. 3. In one preferred embodiment, attachment means 60 includes a hook and loop type fastener 62 that attaches to a second hook and loop type fastener 62, as illustrated in FIG. 4. In one preferred embodiment, attachment means 60 secures warming apparatus 20 to fishing rod handle 32 by affixing attachment means 60 to both the fishing rod handle 32 and the warming apparatus 20.

In one preferred embodiment, attachment means 60 includes a captivating member 65 that is designed to be coupled with fishing rod handle 32, as illustrated in FIG. 5. Captivating member 65 is a relatively fixed member that is in the form of a ring. Preferably captivating member 65 is manufactured from a semi-rigid material such as spring steel, steel, aluminum, metal, rubber, plastic or any semi-rigid, flexible material known to those skilled in the art. If captivating member 65 is used as attachment means 60, an opening 74 is made between first edge 42 and second edge 44. Opening 74 is the area between first edge 42 and second edge 44, as marked with dashed lines in FIG. 5. In order to secure fishing rod handle 32 to warming apparatus, fishing rod handle 32 is pushed through opening 74, and captivating member is coupled around the circumference of fishing rod handle 32.

In one preferred embodiment, attachment means 60 includes at least one elastic band 64 to connect first edge 42 with second edge 44, as illustrated in FIG. 6. By using elastic band 64 to connect first edge 42 with second edge 44, warming apparatus 20 can be secured to a wide variety of fishing rod handles 32 having a wide variety of circumferences C. While the above use of attachment means 60 to secure warming apparatus 20 to fishing rod handle 32 has been described in general, as will be appreciated by those of skill in the art, first edge 42 may be connected to second edge 44 and/or warming apparatus 20 may be affixed to fishing rod handle 32 in many ways known to those skilled in the art, and the above use of attachment means 60 is in no way intended to limit the manner and the devices that may be used to secure warming apparatus 20 to fishing rod handle 32.

Preferably, warming apparatus 20 is manufactured from a bendable, pliable material such as cloth, plastic, vinyl, neoprene, denim, plastic, rubber, polyester, or any other suitable material known to those skilled in the art. More, preferably, warming apparatus 20 is manufactured from a water resistant material such as vinyl, polyester, rubber, plastic, or any other water resistant material known to those skilled in the art.

Warming apparatus 20 is operated by activating heat pack 50. If heat pack 50 is a chemical heat pack 50, then a chemical reaction must be started in heat pack 50 that generates heat. If heat pack 50 generates heat using electricity, then electricity must be supplied to heat pack 50 so that heat pack 50 can generate heat. Heat can be generated by heat pack 50 either before or after heat pack 50 is secured to warming apparatus 20. Heat pack 50 is secured to warming apparatus 20 through retaining mechanism 40. Once heat pack 50 is secured to warming apparatus 20, warming apparatus 20 then secured to fishing rod handle 32 using attachment means 60, as described above. Upon securing warming apparatus 20 to fishing rod handle 32, and upon activating heat pack 50, a fisherman can simultaneously warm his hands and fish using fishing rod 30 by placing his hands around warming apparatus 20.

Thus, there has been disclosed in accordance with the invention, an apparatus and method for warming a fishing rod handle that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

What is claimed is:

1. A warming apparatus for wrapping around a portion of a fishing rod handle to warm the hands of a fisherman, the apparatus comprising:

a retaining mechanism having a first edge opposed to a second edge, the, retaining mechanism adapted to removably receive at least one heat pack, wherein the at least one heat pack is secured to the retaining mechanism; and attachment means for connecting the first edge with the second edge, wherein the warming apparatus is adapted to fold substantially around a length of the fishing rod handle, wherein the attachment means secure the warming apparatus to the fishing rod handle when the first edge is connected with the second edge, whereby the fisherman's hands are warmed when the fisherman holds the fishing rod handle, and wherein the first edge and the second edge have a length substantially equal to the length of the fishing rod handle.

2. An apparatus for a fishing rod handle to warm the hands of a fisherman, the apparatus comprising:

at least one heat pack;

a retaining mechanism having a first edge opposed to a second edge, the retaining mechanism adapted to receive at least one heat pack; and an attachment member connected to the retaining mechanism, wherein the attachment member is adapted to secure the warming apparatus to the fishing rod handle, wherein the attachment member is adapted to connect the first edge with the second edge, and wherein the attachment member comprises a captivating member adapted to be coupled with the fishing rod handle.

3. An apparatus for a fishing rod handle to warm the hands of a fisherman, the apparatus comprising:

at least one heat pack;

a retaining mechanism having a first edge opposed to a second edge, the retaining mechanism adapted to receive at least one heat pack; and an attachment member connected to the retaining mechanism, wherein the attachment member is adapted to secure the warming apparatus to the fishing rod handle, wherein the attachment member is adapted to connect the first edge with the second edge, and wherein the attachment member comprises at least one elastic band connected with the first edge and the second edge.

4. An apparatus for a fishing rod handle to warm the hands of a fisherman, the apparatus comprising:

at least one heat pack;

a retaining mechanism having a first edge opposed to a second edge, the retaining mechanism adapted to receive at least one heat pack; and an attachment member connected to the retaining mechanism, wherein the attachment member is adapted to secure the warming apparatus to the fishing rod handle, and wherein the attachment member comprises at least one captivating member for securing the warming apparatus substantially around the fishing rod handle.

* * * * *

UNITED STATES PATENT AND TRADEMARK OFFICE
CERTIFICATE OF CORRECTION

PATENT NO.   : 6,427,678 B1
DATED        : August 6, 2002
INVENTOR(S)  : William K. Trzeciak It is certified that error appears in the above-identified patent and that said Letters Patent is hereby corrected as shown below:

<u>Column 6,</u>
Line 2, delete "the," and substitute -- the -- in its place.

Signed and Sealed this

Third Day of February, 2004

JON W. DUDAS
*Acting Director of the United States Patent and Trademark Office*